Patented Aug. 28, 1934

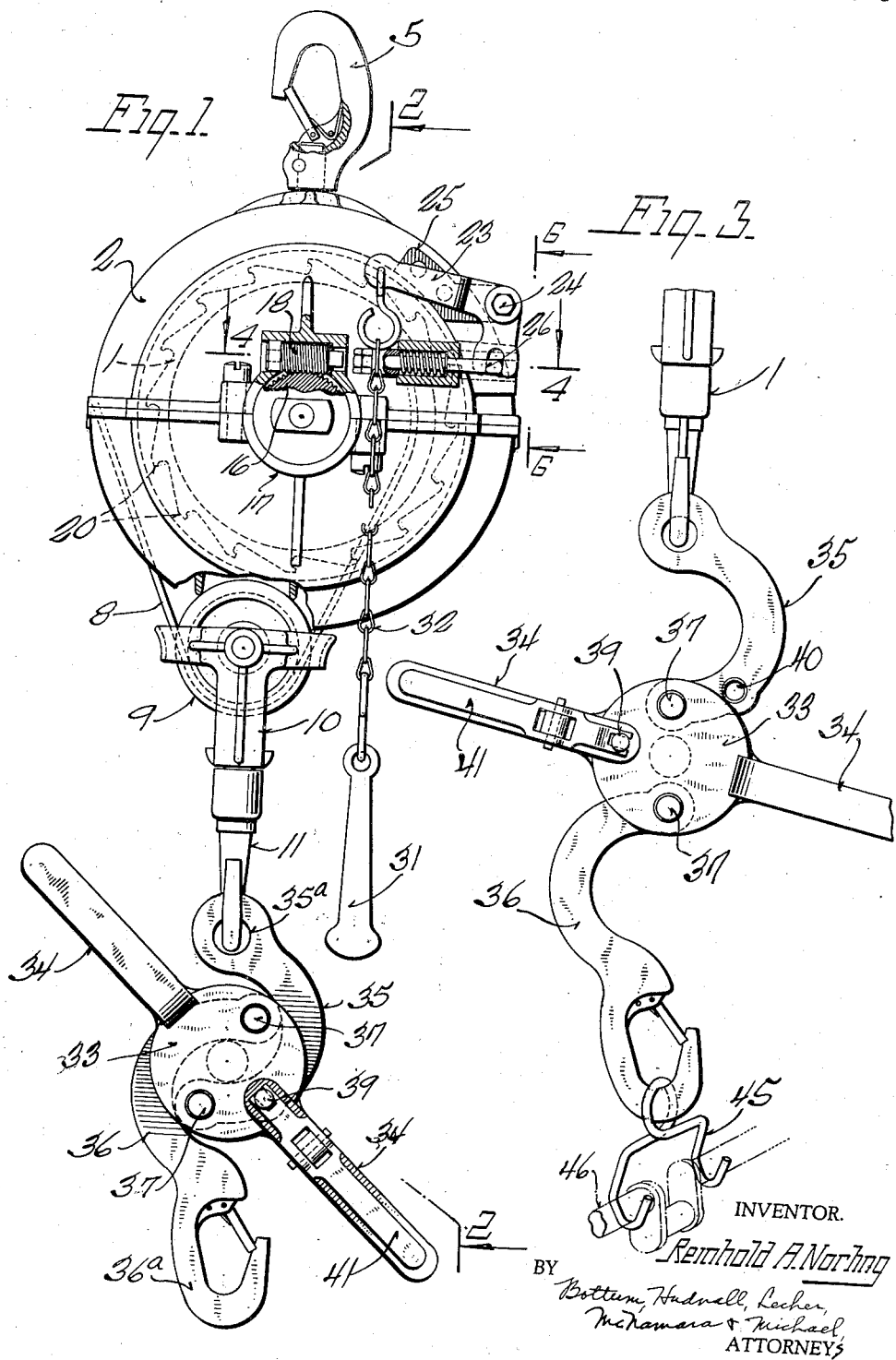

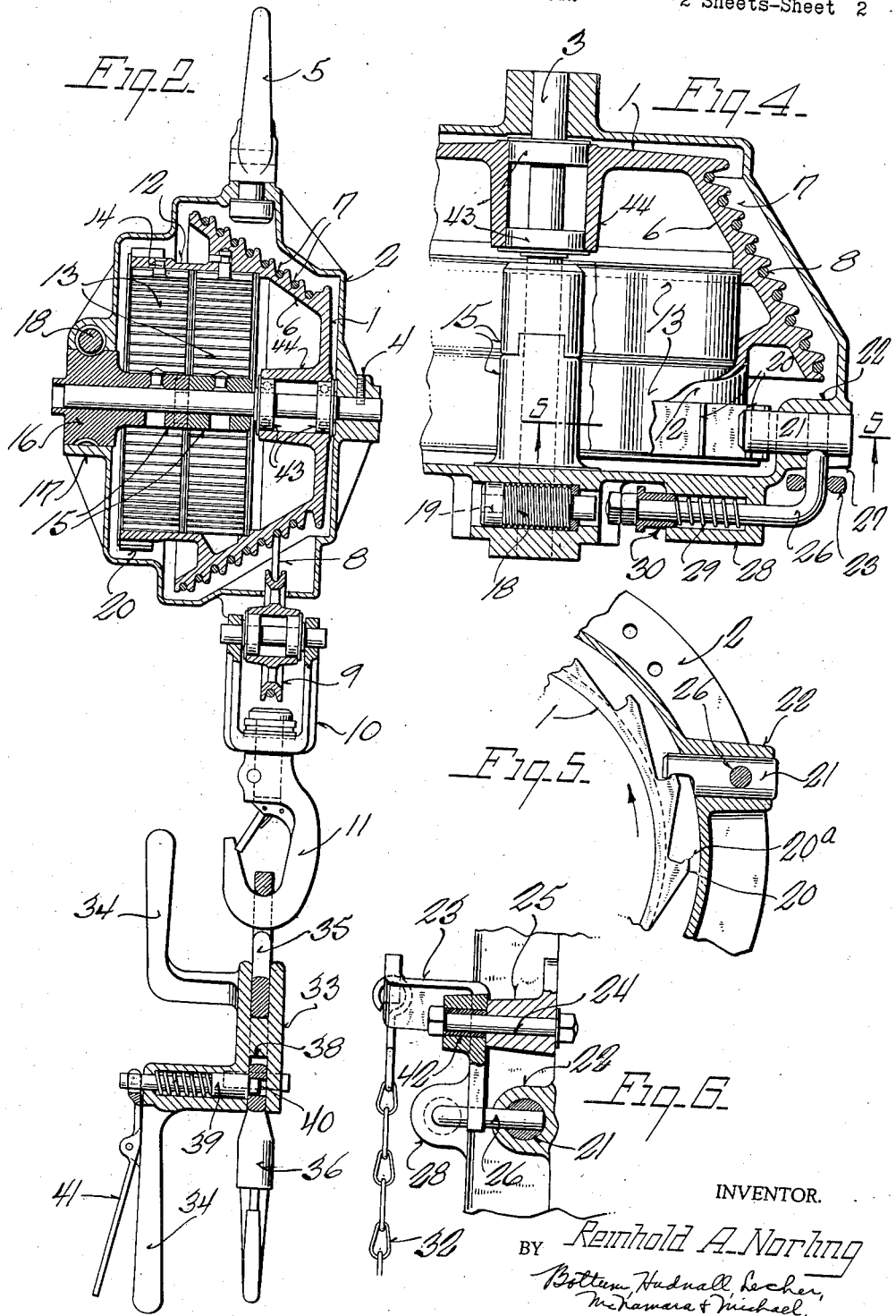

1,971,498

UNITED STATES PATENT OFFICE 1,971,498

COUNTERBALANCE AND LOADING AND UNLOADING DEVICE THEREFOR

Reinhold A. Norling, Aurora, Ill., assignor to Independent Pneumatic Tool Co., Chicago, Ill., a corporation of Delaware Application December 10, 1932, Serial No. 646,615

12 Claims. (Cl. 242—107)

This invention relates to a counter-balance for use in shops and factories for raising, lowering and suspending loads, such as tools and the articles to be operated upon, and also to a loading and unloading device for use with the counter-balance for applying loads to and releasing the same therefrom.

The general purpose and object of my invention is to provide a counter-balance and loading and unloading device therefor, both simple in operation, yet sturdy and strong in construction to effectively serve the purposes for which they are designed.

Another object of my invention is to provide an improved manually releasable locking means for holding the spring actuated drum of the counter-balance against rotation in a direction to wind the load lifting rope or cable thereon when the counter-balance is at rest, as when applying a load to the cable or when suspending a load in a raised position thereby.

Another object of my invention is to provide the loading and unloading device in the form of an attachment for use with the counter-balance, whereby the latter may be used with or without the loading and unloading device as desired.

A further object of my invention is to provide the loading and unloading device with arms or other means and a mechanism whereby the arms may be extended or retracted to lengthen or shorten the reach of the device as required for applying a load to and releasing it from the cable of the counter-balance.

A further object of my invention is to provide a manually movable member for controlling the extendibility of said arms.

A further object of my invention is to provide a locking means for holding the arms against accidental movement when in retracted or closed positions.

Other and further objects of my invention will appear from the following specification taken in connection with the accompanying drawings, in which—

Fig. 1 is a side elevational view, partly in section, of a counter-balance equipped with a loading and unloading device of my invention;

Fig. 2 is a vertical sectional view, with parts in elevation, taken on line 2—2 of Fig. 1;

Fig. 3 shows the loading and unloading device in open or extended position;

Fig. 4 is a horizontal sectional view taken on line 4—4 of Fig. 1;

Fig. 5 is a vertical sectional view taken on line 5—5 of Fig. 4; and

Fig. 6 is a front view, with parts in section, taken on line 6—6 of Fig. 1.

The counter-balance shown in the drawings has a drum 1 rotatably mounted in a support in the form of a casing 2 on a shaft 3. The latter extends through the drum and is fixed against rotation in the casing in any desired manner, as by a tight fit in the casing and pin 4 shown in Fig. 2. A hook 5 has swiveled connection with the top of the casing for suspending the balancer from an overhead support (not shown).

The drum 1 has an inclined or tapered rope or cable supporting portion 6 provided on its outer side with a spiral groove 7 to guide and hold the cable 8 by which the load handled by the balancer is connected thereto. The opposite ends of the cable are fastened to the drum (larger end) and the casing 2, respectively, to provide a loop in the cable below and exterior of the casing as shown in Fig. 1. The lower portion of the casing is open so that the cable may extend out of the same from the drum. A sheave or pulley 9 in the block or frame 10 is supported in the loop of the cable, the frame having a depending swiveled hook 11, as shown in Figs. 1 and 2.

The drum has a tubular portion providing a barrel 12 containing one or more flat spiral springs 13. These springs surround the shaft 3 in lateral or side by side relation and have their outer ends fixed to the barrel in any preferred manner, as by rivets 14, 14, shown in Fig. 2. The inner ends of the springs are similarly fixed to sleeves 15, 15, one for each spring, and rotatably mounted on the shaft 3. When a number of springs are employed for the drum, the sleeves are made separate for assembling purposes, but when assembled, as shown in Figs. 2 and 4, are connected, as by a tongue and slot connection, for rotation in unison. The outer end of the outermost sleeve 15 is enlarged to provide a worm gear 16 which has rotative bearing in a bearing lug or projection 17 at the associated side of the casing 2. As shown in Fig. 1, the casing 2 is of the split or two part type, being divided horizontally into upper and lower sections through the bearing lug 17. A worm 18 in mesh with the worm gear 16 is rotatably supported in the upper half of the bearing lug 17, said worm having a tool receiving socket 19 at one end whereby the worm may be turned to adjust the tension of springs 13. This construction is disclosed and claimed in my co-pending application filed March 16, 1931, Serial No. 523,164.

To hold the drum from rotation in a direction to wind the cable thereon, whenever desired, (such direction being indicated by the arrow in Fig. 5), I provide a latch or locking mechanism comprising ratchet teeth 20 on the drum and a co-operating pawl 21 therefor on the case 2. The teeth are arranged about the axis on the drum on the outer side of the barrel 12, as shown in Figs. 1, 2, 4 and 5. The pawl is slidably mounted in the case in a boss 22 thereon, the inner end of the pawl being hook-shaped to engage over projections 20a on the teeth 20 to prevent accidental release of the pawl from the drum.

A bell crank lever 23 arranged on the drum case 2 is provided to control the action of the pawl. Lever 23 is fulcrumed at 24 on a bracket 25, the latter in the form of the construction shown in Fig. 1, being bolted or otherwise secured to the drum case above the pawl. Connected with the pawl is an angularly bent rod 26 which, where it extends outwardly from a side of the pawl, passes through a slot 27 in the pawl support 22, thereby permitting the pawl to be slid into and out of engagement with the teeth of the drum. Rod 26 after it leaves the slot 27 extends along the outside of the case 2 in a direction toward the shaft 3 in parallel relation to the axis of the pawl and is slidably mounted in a boss 28 provided therefor on the case. A coiled spring 29 surrounds the rod in the boss 28 and bears against the boss and an abutment 30 on the rod to normally urge the rod in a direction to project the pawl into engagement with the teeth on the drum. The lower end of the lever 23 engages the rod 26 where it extends outward from the pawl, so that when the other end of the lever is pulled downward, as by the handle 31 at the lower end of a chain 32, the pawl will be slid outward to release its hold on the drum. The rod extending through the slot 27 prevents turning of the pawl in the case. The lower end of the lever 23 may be bifurcated to engage the rod, as shown in Figs. 1 and 4.

The loading and unloading device of my invention is used as an attachment for the counter-balance and is suspended from the lower hook 11 thereof, as shown in Figs. 1 to 3. The device comprises a turnable or rotatable body member preferably in the form of a spool 33 having handles or grasping portions 34, 34 on opposite sides of the spool in diametric disposed relation and extending radially outward therefrom. The handles may be integrally connected with the spool, as shown. Members 35, 36 in the form of arms are swingably fastened to the spool by bolts 37 on opposite sides of the axis of the spool and in the annular groove or recess 38 thereof. The upper end of arm 35 is provided with an eye 35a or other means for attachment to the lower hook 11 of the counter-balance. The lower end of arm 36 is provided with a hook 36a or other means for connection with the load to be handled by the counter-balance. When the loading and unloading device is suspended from the counter-balance, the spool 33 is rotatable about the axis of the lower bolt 37. With this bolt in eccentric relation to the axis of the spool, the reach or range of the loading and unloading device may be shortened or extended depending on whether the spool is turned to close or retract the arms as in Figs. 1 and 2 or opened to extend them as shown in Fig. 3. The arms 35, 36 are curved, as shown, to partially fit about the axis of the spool when in collapsed or retracted positions and thus enable the bolts 37 to pass center to provide for the self-locking of the arms. The latter under the downward pull of the weight of the load on the lower arm will hold the arms in abutting relation to keep the arms in closed or retracted positions. While this manner of holding the arms closed will answer for all normal conditions of raising and lowering a load by the counter-balance, yet, in case of a sudden raising of the load, the upwardly applied force is likely to open or extend the arms to drop the load with a jerk on the counter-balance. To prevent this, I provide a locking mechanism as follows.

A spring pressed locking bolt 39 is fitted in one of the handles 34 and is projectable into an aperture or recess 40 in the upper arm 35, as shown in Fig. 2. The outer end of the bolt is engaged by a lever 41 pivoted on the handle, as shown. With this arrangement, the bolt will securely lock the loading and unloading device in closed position and prevent accidental opening of the same to jerk or drop a load. The handles, as shown in Fig. 2, are angularly shaped to extend outwardly from the side of the spool so that their outer or grasping ends may swing free of the arms 35, 36 and the parts to which they are connected when in use. The groove or recess 38 in the spool provides a guide for the arms 35, 36 and supports them from lateral displacement.

The pivotal mounting for the lever 23 is detailed in Fig. 6. As illustrated, the mounting comprises the fulcrum 24 in the form of a bolt passing through the bracket 25 and the lever 23. A sleeve 42 on the bolt supports the lever and has a length to prevent tightening of the bolt from hindering the free rocking movement of the lever.

The drum 1 is mounted on the shaft 3 through anti-friction bearings 43, 43 supported in a tubular support 44 carried by the drum and extending inwardly over the shaft, as shown in Figs. 2 and 4.

The device shown and described, is used in the following manner. With the counter-balance suspended from an over-head support, the loading and unloading device is drawn down until within reach of the load to be lifted and handled. The drum 1, in the downward pull on the cable rotates in a direction to unwind the cable, the teeth on the drum ratcheting over the pawl, the latter sliding outward against the tension of the spring 29. To pick up a load, the loading and unloading device is unlocked by the bolt 39 and the spool 33 is rotated to extend the arms or members, 35, 36. This lengthens the reach of the device and the lower arm 36 is connected with the load without lifting the load from its underlying support. Usually a supplemental attaching means in the form of a short section of coil, rope or wire in looped form or a hook provided fixture 45 (Fig. 3) is employed for connecting the arm 36 with the load. After the load has been applied, the spool 33 is turned by the handles to lift the load and suspend it from the counter-balance. The lifting of the load at this time is accomplished solely through the loader, the drum of the counter-balance being held from rotation to lift the load by the pawl 21. The operator then pulls downward on the load or cable to release the projection 20a of the tooth at the pawl from the hooked end thereof, whereupon a downward pull on the chain 32 will withdraw the pawl from the path of the teeth and permit the springs to rotate the drum in a direction to wind the cable thereon and lift the load. The operator holds the chain down until the load has been lifted to the desired extent, whereupon the chain is released and the pawl returns to its locking position to hold the drum against further load lifting operation. The load is then swung to where it is desired to place it, as between the centers of a grinder or lathe, if the load being handled is in the form of an unfinished automobile crank shaft 46, as indicated in Fig. 3. The range of movability of the lifted load is of course increased if the counter-balance is suspended from an overhead trolley, as is often the case in shops where devices of this character are employed.

After the load is placed where desired, the unloader is turned to its open or extended position and the load detached from the handling fixture. The unloader cannot raise as the drum of the counter-balance is held against a lifting rotation by the pawl. When handling an unfinished crank shaft, as herein referred to, the crank after being positioned between the centers of the lathe or grinder, is clamped therein while still supported by the counter-balance, whereupon the spool is turned to release the crank. With the drum held from rotation by the pawl, the hooks 45 remain at the proper elevation to be re-engaged with the crank shaft after the finishing operation thereon has been completed, whereupon the finished crank is carried back to the floor by the counter-balance and another unfinished crank is lifted and set in the machine as before. This relieves the workman of lifting the crank. Moreover, the counter-balance holds the crank suspended at the right height for the centers of the lathe or grinder which would be a difficult job for the operator to hold the crank and at the same time fasten it in the finishing machine. The device of my invention is usable for lifting and handling other loads, the crank shaft being referred to by way of example only. When setting the counter-balance for lifting a given range of loads, the loading and unloading device with attaching fixture thereon is first lowered to where the loads are at rest, and the tension of the springs 13 is then adjusted through the worm 18 to lift the loads, one at a time as they are applied to the counter-balance.

The loading and unloading device of my invention has the following advantages. The suspension hook 11 of the counter-balance need not be lowered to the lowermost position of the load to be connected with it, thereby avoiding undue tightening and straining of the spring means for winding up the drum. The load may be applied to the counter-balance without changing the elevation of the hook 11 after it has been lowered to within reach of the load by the loading device. This avoids a close setting of the teeth on the drum, thereby enabling relatively large and strong teeth to be used to support loads without chance of breaking when overloaded. Moreover, large teeth wear better than small teeth, as they ratchet over the holding pawl. The unloader also enables the load to be readily and easily released from the counter-balance without slackening its cable or rotating the drum after the load has reached its place for release.

Other and further advantages of my invention will be apparent to those skilled in the art to which it pertains. Moreover, the details of construction and arrangement of parts may be variously changed and modified without departing from the spirit and scope of my invention, except as pointed out in the appended claims.

I claim as my invention:

1. In a counter-balance of the character described, a drum, a cable windable on the drum, a support for the drum, spring means for rotating the drum in a direction to wind the cable thereon, a pawl slidably carried by the support and engageable with ratchet-teeth on the drum for holding the drum against rotation in cable winding direction, an angularly fashioned rod connected with the pawl and extending outwardly therefrom through the slot in the support, spring means carried by the support and operating on the rod to normally urge the pawl into engagement with the teeth on the drum, and manually operable means carried by the support and engageable with the rod for withdrawing the pawl from said teeth to free the drum for rotation by its spring.

2. In a counter-balance of the character described, a drum, a cable windable thereon, a support for the drum, a barrel carried by the drum, spring means housed in said barrel and connected therewith to rotate the drum in the direction of the wind of the cable thereon, a pawl carried by the support and engageable with ratchet-teeth on the exterior of the barrel for holding the drum against rotation in cable winding direction, and manually operable means carried by the support and engageable with the pawl for releasing the same from the teeth on the barrel to free the drum for rotation by its spring.

3. The combination with a spring actuated counter-balance of the character described having a cable and a load suspending element carried thereby, of a loading and unloading device for the counter-balance, said device having a pair of extensible and contractible arms, one for connection with the element for attaching the device thereto and the other for connection with the load to be handled by the counter-balance, and means included in the device for extending and retracting the arms thereof.

4. The combination with a spring actuated counter-balance of the character described having a cable and a suspension element carried thereby, of a loading and unloading device for the counter-balance, said device having a rotatable member and arms swingably connected therewith in eccentric relation to the axis of the member for extension and retraction in the rotation of the member, one of the arms serving to connect the device to the suspension element on the cable and the other serving to connect a load to the element.

5. The combination with a spring actuated counter-balance of the character described having a cable and a suspension element carried thereby, of a loading and unloading device for the counter-balance, said device comprising a rotatable member in the form of a spool and a pair of arms swingably connected with the spool in eccentric relation to the axis thereof for retraction on rotating the spool in one direction and for extension on rotating the spool in the opposite direction, one of the arms serving to connect the spool with the suspension element on the cable and the other arm serving as a means for applying a load to the cable, said arms being in curved form so as to fit about the axis of the spool when retracted and having the centers of their pivotal connection on opposite sides of the line of load when suspended from the counter-balance to hold the arms in retracted position.

6. The combination with a spring actuated counter-balance of the character described having a cable and a suspension element carried thereby, of a loading and unloading device for the counter-balance, said device comprising a rotatable member in the form of a spool, a pair of arms swingably connected to the spool in eccentric relation to the axis thereof, whereby the arms may be retracted and extended on rotation of the spool in opposite directions, one of the arms serving for connecting the spool to the suspension element on the cable and the other serving to connect a load to the cable, said arms being in curved form to fit within an annular groove or recess within the spool when in retracted position.

7. The combination with a spring actuated counter-balance of the character described having a cable and a suspension element carried thereby, of a loading and unloading device for the counter-balance, said device comprising a rotatable member in the form of a spool, a pair of arms swingably connected with the spool in eccentric relation to the axis thereof, whereby the elements may be retracted toward the spool on rotating it in one direction and extended from the spool on rotating it in the opposite direction, a pair of handles carried by the spool for turning it, and means carried by the spool and one of the arms for locking and holding them in their retracted positions.

8. The combination with a spring actuated counter-balance of the character described having a cable and a suspension element carried thereby, of a loading and unloading device for the counter-balance, said device comprising a rotatable member in the form of a spool, a pair of arms swingably connected with the spool in eccentric relation to the axis thereof, whereby the arms are retracted toward the spool on rotating the spool in one direction and extended from the spool on rotating it in the opposite direction, a pair of handles carried by the spool for turning it, a spring pressed locking member carried by one of the handles and engageable with the locking recess or aperture in one of the arms for locking the arms in their retracted or closed positions, and means carried by the handle equipped with a locking member for releasing the same from the co-operating arm to permit extension of the arms on rotating the spool in a direction to extend the arms beyond the spool.

9. A loading and unloading attachment for spring actuated counter-balances, comprising a rotatable member, a pair of arms pivotally connected to the member on opposite sides thereof and in offset relation to the axis of the same, whereby the arms may be retracted toward the member on rotating the member in one direction and extended on rotating the member in the opposite direction, a pair of handles carried by the member for rotating it, and locking means carried by one of the handles and engageable with one of the arms for positively locking the arms in their retracted or closed positions.

10. The combination with a spring actuated counter-balance of the character described having a raising and lowering element and a suspension member carried thereby, of a loading and unloading device for the counter-balance and connected with the element, said device having extensible and contractible arms to increase and decrease the reach of the counter-balance when the suspension member thereof is lowered to a position adjacent the load to be lifted and suspended thereby.

11. In a counter balance of the character described, a drum, a cable windable on the drum, a support for the drum, spring means for turning the drum in a direction to wind the cable thereon, a spring pressed pawl slidably carried by the support and engageable with ratchet teeth on the drum for holding the drum against rotation in cable winding direction, a member extending laterally outward from the pawl, and a two arm lever fulcrumed on the support adjacent the pawl, one arm engaging said member and the other arm being free whereby the lever may be actuated to withdraw the pawl from the teeth of the drum to free the drum for rotation by its spring.

12. In a counter balance of the character described, a drum, a cable windable on the drum, a support for the drum, spring means for turning the drum in a direction to wind the cable thereon, a pawl slidably carried by the support and engageable with ratchet teeth on the drum for holding the drum against rotation in cable winding direction, said pawl and said teeth having interlocking projections to prevent accidental withdrawal of the pawl from the teeth when engaged therewith and requiring that a slight reverse rotation be given the drum to free the pawl for withdrawal from the teeth, and means carried by the support for withdrawing the pawl from the teeth when released therefrom.

REINHOLD A. NORLING.